Aug. 12, 1930.  F. LÓPEZ-OSORIO  1,772,672
CONVERTIBLE CAR BODY
Filed March 30, 1928   6 Sheets-Sheet 1
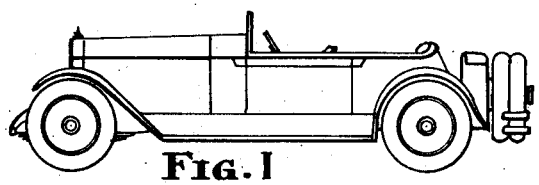
Fig. I
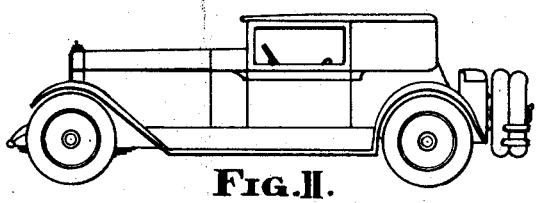
Fig. II
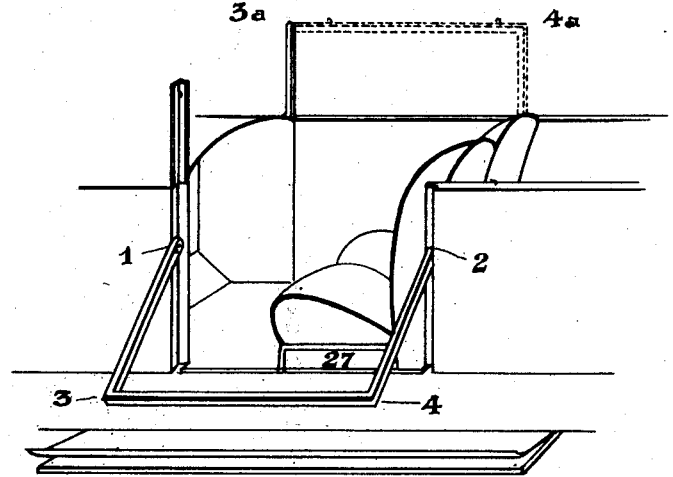
Fig. III
Fig. IV
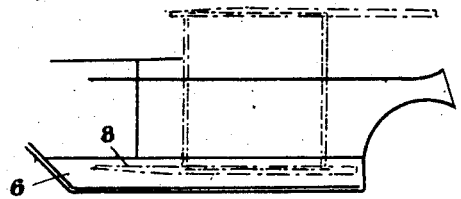
Fig. V
Félix López Osorio
INVENTOR
BY
his ATTORNEY Aug. 12, 1930.   F. LÓPEZ-OSORIO   1,772,672
CONVERTIBLE CAR BODY
Filed March 30, 1928   6 Sheets-Sheet 2
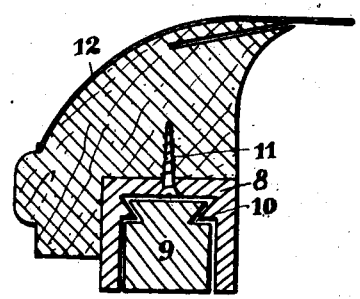
Fig. VI
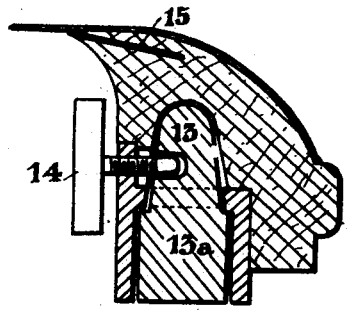
Fig. VII
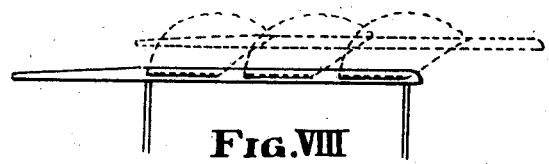
Fig. VIII
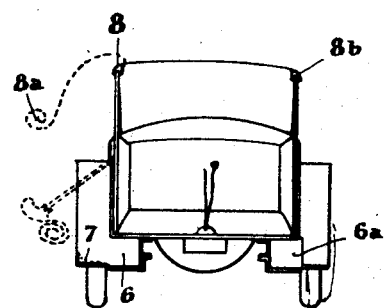
Fig. IX
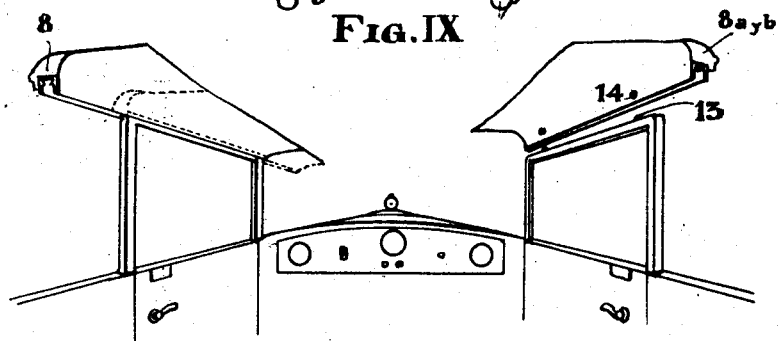
Fig. X
Felix López Osorio
INVENTOR
BY
his ATTORNEY

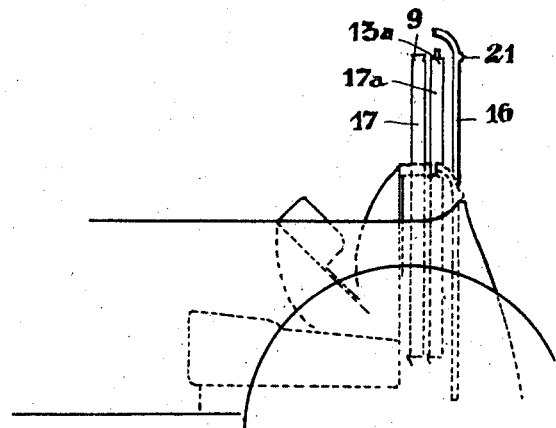
Fig. XI.
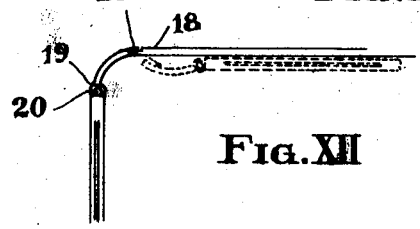
Fig. XII
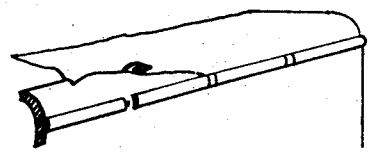
Fig XIII
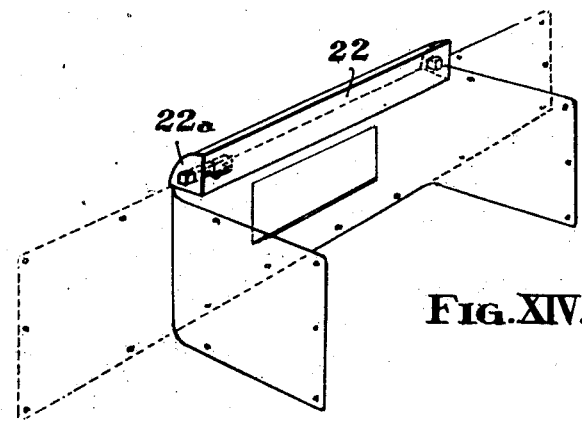
Fig. XIV.
Félix López-Osorio
INVENTOR
BY
his ATTORNEY.

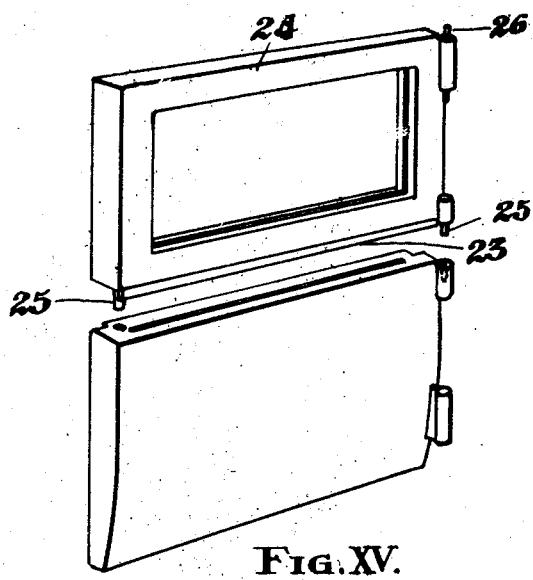
Fig. XV.
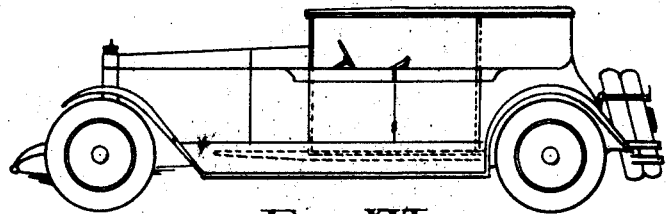
Fig. XVI.
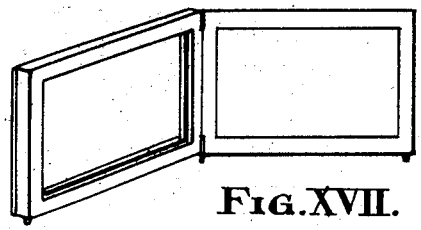
Fig. XVII.

Aug. 12, 1930.  F. LÓPEZ-OSORIO  1,772,672
CONVERTIBLE CAR BODY
Filed March 30, 1928    6 Sheets-Sheet 5
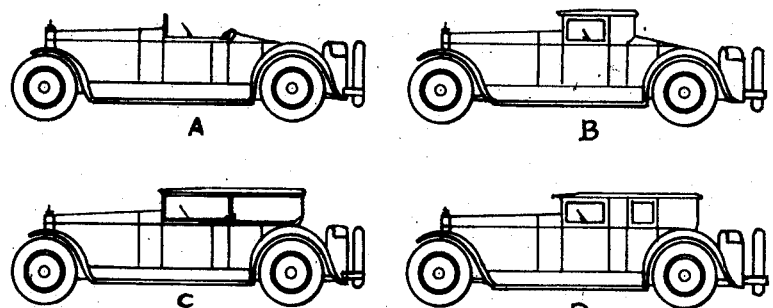
Fig. XVIII.
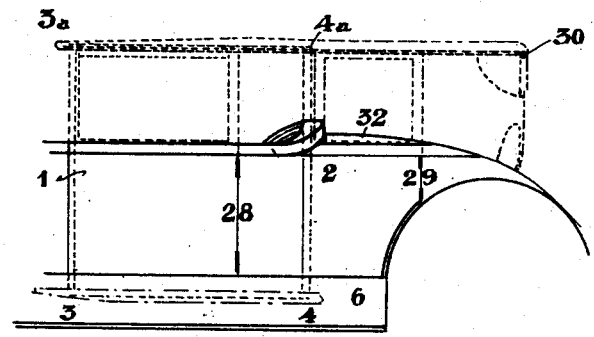
Fig. XIX.
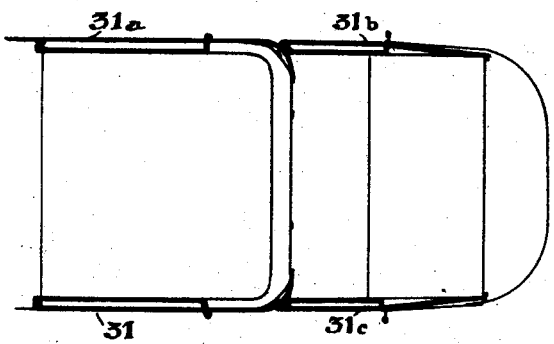
Fig. XX.
Félix López Osorio
INVENTOR
BY
ATTORNEY Aug. 12, 1930.　　　F. LÓPEZ-OSORIO　　　1,772,672
CONVERTIBLE CAR BODY
Filed March 30, 1928　　　6 Sheets-Sheet 6
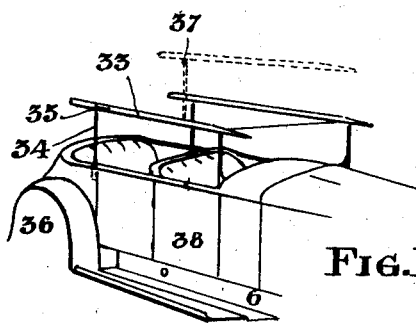
FIG. XXI.
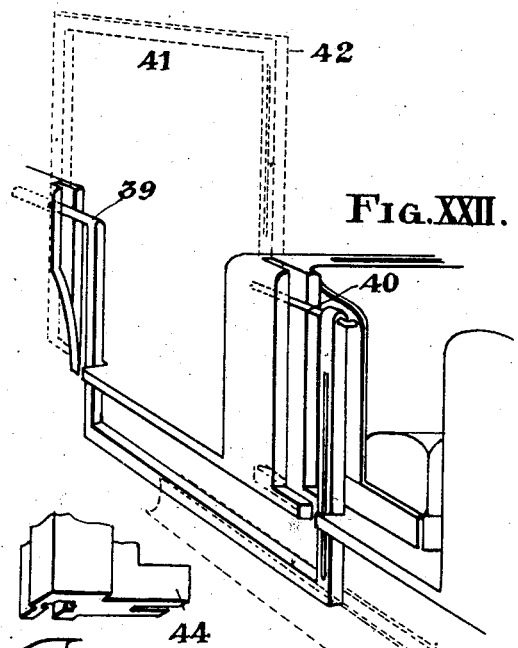
FIG. XXII.
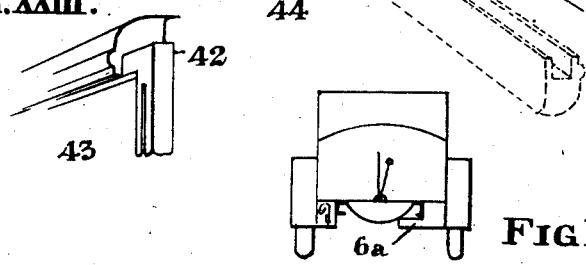
FIG. XXIII.
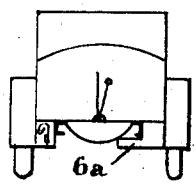
FIG. XXIV.
Félix López Osorio
INVENTOR
BY *Otto Munk*
his ATTORNEY Patented Aug. 12, 1930

1,772,672

UNITED STATES PATENT OFFICE

FÉLIX LÓPEZ-OSORIO, OF BUENOS AIRES, ARGENTINA

CONVERTIBLE CAR BODY

Application filed March 30, 1928. Serial No. 266,014.

The object of the present invention is the construction of a convertible type of car body which in any of its positions, open or closed, will hide the mechanism in such a way, as to offer from its exterior, no intimation that it is convertible.

With the system hereafter described, this result is easily achieved; when open, the cover or better said the roof, as it is one, disappears completely. And when closed, it shows all the features, the profile and the conformation of car bodies with a rigid and immovable roof, because the roof and its shutting device are constructed precisely with the same elements as those now used for closed bodies.

The transformation can be done in less time than that now required to close a car body of the "double phaeton" type and much less effort is required.

To make this description clearer, drawings as detailed below, are added.

Figures 1 and 2 show front elevations respectively, an open and a closed coach body.

Figure 3 shows the manner in which the lateral swings which support the roof are retained.

Figure 4 is a horizontal section through the swing fastening means.

Figure 5 shows in dotted lines, the positions which the swings and the longitudinal beams take in their mounted and unmounted positions.

Figures 6 and 7 show the retention system between the longitudinal beams of the roof and the swings.

Figure 8 shows the possibility of using three pivoted extensions in such a way as to be able to bring by a single arcuate movement, the beam to its corresponding position.

Figure 9 shows the mounted roof and the position which the swings and the roofing cloth take in their mounted and unmounted position.

Figure 10 shows the union between the swings and the roof seen from the interior of the coach.

Figure 11 shows the manner in which the rear panel and the side panels are kept.

Figure 12 represents the manner in which the rear panel and the side panels are unfolded and mounted.

Figure 13 shows one of the ways in which the roofing cloth is attached to the rear panel.

Figure 14 shows a variation in the construction of the rear part and the side parts by means of a rigid transversal beam and a cloth band.

Figure 15 shows the door, divided into two parts, in which the upper door case can be withdrawn and kept under the seat.

Figure 16 represents a mounted "double phaeton sedan", where the position is shown which the longitudinal beams take in the cavity of the foot board.

Figure 17 represents the double frame or high part of the doors which can be folded so as to be kept in the mentioned space.

Figure 18 represents various of the transformations which, through this body system, the "voiturette" type can assume.

Figure 19 shows a transformable "voiturette" body type, in accordance with this invention.

Figure 20 is a horizontal section of the forementioned type.

Figure 21 represents a variation in the form of mounting the longitudinal beams of the roof.

Figure 22 is a variation in the form of retaining the swings.

Figure 23 is a detail of the form in which the longitudinal beams and the frame for the "cabriolet" type are combined.

Figure 24 represents the space formed between the body and the foot board for keeping the front frame.

Elements: Coach type

*Roof.*—This consists in a bail shaped iron bar called a swing, with its two ends secured to the counterframe of the doors by two hinges 1 and 2, Figure 3.

The two vertical sections of this swing repose against the counterframe in channels specially provided for this purpose, and they pass in their swing, an arc which is adequately cut, so that the horizontal section 3—4 remains beneath this, in the free space which exists between the body and the foot board.

When the door is placed and closed, it will cover the vertical parts of the swing with the flange 5, Figure 4, into which the lock bolt will fit.

The door, when entirely open, will permit the swing to turn on its hinges and move upwards so as to remain in the position which, correlatively on the other side of the coach, is indicated by 3ª—4ª, Figure 3, where it will be kept in place by a simple spring latch which exists at the upper end of the windshield rods.

In the free space left between the body and the foot board and along the whole length of this, exists a box 6, Figures 5 and 9, having a cover 7, Figure 9, which opens by means of spring hinges placed in its interior part.

Into said box the longitudinal beam 8, Figure 5, will be put. This is constructed of wood which is secured to the horizontal rod of the swing, being embedded like a rail, as will be seen from the sectional cut in Figure 6, in which the swing rod forms the rail or male part 9, and the beam the railbed, or female part 10. This railbed must be made of iron and fixed to the beam by screws like 11.

When the swing is moved upwards, it will carry with it as already indicated, the longitudinal beam, which when pushed upon the rail, will take the position which is shown in Figure 5.

To get it into this position, three small movable extensions can be used as indicated in Figure 8. In this case, the rail embedded part of Figure 6 must have a form of construction which makes it detachable.

The longitudinal beam of which we speak, has at the outside of the coach and at its inside, all the features of those which nowadays are used for the construction of rigid roofs, viz moulding or drainage for rain and channeling for the shutting of the doors.

At the external upper part 12, Figure 6, the cloth or leather which forms the roof, will be in the usual way firmly attached, and will have attached to it the longitudinal beam which belongs to the other side. This will be rolled up in said cloth 8ª, Figure 9, and will come together with the beam 8 from the box 6.

To mount the roof, it will be sufficient to unwind the cloth or leather and move 8ª to 8ᵇ, Figure 9, where it will meet the swing raised on the other side of the coach, to which it will be fixed by means of the socket 13, Figure 10, and the screw or lug 14, Figure 7. (See also the same numbers in Figure 10).

The stretching of the cloth or leather can be obtained by the spacing of the swings or by means of one or more steel bands which may have a width of three or four centimeters, a thickness of a millimeter and a length which covers the distance between both beams. These bands will be placed along the beam in a groove, formed in the wood by a simple saw cut, see 15, Figure 7, and each at one of its ends it will have a small screw axle so as to enable it to open like a knife blade and allow its other end to be inserted in the groove of the opposed beam.

The greater or smaller inclination of these wood cuts and the length of the steel band will determine the bend of the roof and its stretching.

*Hind panel and side panels.*—Once the roof is mounted, the rear part of the coach and the adjoining side panels remain to be closed.

In coaches in which their price permits it, a rigid construction in metallic sheets will be used and this will consist in a rear panel and two side panels which have the same features as those nowadays used for closed coaches.

The rear panel 16, Figure 11, carrying with it the side panels 17 and 17ª which are folded upon it, will be raised by rails from a box which is located, as shown in the figure, between the back of the seat and the final end of the body. The raising can be done by a system of handles as those in use for the door windows.

The panels will then open each on one side, for which purpose each one will use the system of hinges 18 and 19, Figure 12, which are relatively compact and simple.

The separation line between the rear panel and the side panels with the sheet part which forms the curve, will be protected against wind and rain through the flanges 20 and 20ª. This last one will lean upon the male rail through which the whole system comes from the box in which it is kept.

The upper back of the side panels will have male rails like 9, Figure 6, and 13ª, Figure 7, which also can be noticed in Figure 11.

Although this part of the body is described in second term, it must be mounted at first, so that the longitudinal beams which are mounted afterwards, embrace the side panels, one of them when running upon its rail and the other one when dropping upon the opposed swing and the corresponding beam.

The side panels can have in their lower part also small mouldings or flanges to attach them to the body, so as to avoid the passage of wind and rain.

They also can be provided with windows which can be let down by a toothed bar which enters into the body where its construction permits this.

The rear panel will have tapestry on its interior side and will have a window glass. It also will have a moulding 21, Figure 11, at its upper external part which will form a continuation of the same line of the mouldings of the longitudinal beams.

The rounded end of the longitudinal beams serves the purpose that the cloth or leather which is secured to them, places itself like a hat upon the equally rounded part of the rear panel, where if necessary, said cloth could be attached with hooks placed into cuts made in the moulding, so that the head of them occupies the interstices and conceals their existence, imitating the form of the moulding itself, Figure 13.

In the coaches of economical construction all the cost of the rearbox, the embedding and the rigid frame can be avoided, retaining only the transverse beam 22, Figure 14, which unites the ends of the longitudinal beams, to which it is attached by means of a square bolt pin 22ª at one end and a fixed nipple of same shape at the other one.

Said transversal beam holds attached to it, a piece of cloth or leather in the shape shown in the drawing, Figure 14, so as to permit it to be buttoned to the borders of the parts which are to be covered. The window could be of flexible mica.

To store the whole system, it can be extended so as to form one flat sheet and it can be rolled up with the transversal part 22 to be brought into the box 6ª, Figure 9.

*Doors.*—The door will be exactly equal to and will have the same features as those used nowadays for closed coaches, but it will be divided into two sections as shown in Figure 15.

The joint will be hidden behind the small flange 23.

When the glass has been lowered, the frame 24 can easily be separated by an upward movement, because it has as fixing points, only the nipples 25 and 25ª and the male hinge 26 which can be raised or lowered by a spring so as to engage a female hinge or separate from it, this latter one being placed at a convenient part of the longitudinal beam.

The frame is kept in the box which exists beneath the seat 27, Figure 3, and this box opens against the front part which is visible and which can be concealed by a simple hanging curtain made of cardboard and covered with the same cloth or leather which has been used for the interior tapestry.

"*Double phaeton sedan*" *type.* (*Long chassis*)

For this model the same elements as for the coach type are used, with the only difference that the swings are of greater size, comprising the two doors as indicated by the position of Figure 16. Both doors open upon the same hinge axle, and their respective frames as shown in Figure 17, can fold one upon the other to be kept in the beforementioned box.

When the swing is raised, the doors are half open.

"*Voiturette*" *type.* (*Two permanent seats and two more foldable ones*)

The application of the invention to this type of coach will permit commodities and perspectives which up to now, could not be imagined. It will be at the same time, the most original transformation which a car body will have undergone. See in A, B, C and D of Figure 18, the four different aspects which the same coach can show.

The "voiturette" is constructed with four doors, with hinges at the axle lines 28 and 29, Figure 19, so that when open they allow the upward movement of the swing through their vertical parts 1—3 and 2—4, whereby, and following the same proceeding already indicated for the previous models, the roof of the permanent seats at 3ª—4ª will be formed.

*Other roof.*—The fixing of the longitudinal beams to the horizontal rods of the swings is effected at both sides without rail embedding, by the system of nipples 13, Figures 7 and 10, so that they and their cloth, viz the whole roof, can be detached completely from the swings, so as to remain alone within the box 6, Figure 19.

When this detachment is effected, the swings of both sides can be raised quite free of anything and another roof can be put upon them, similar to the previous one, but long, so as to cover the four seats. This second roof is carried permanently in the same box as 6, Figure 19, which exists at the opposite side.

From the rear end of the longitudinal beams of this second roof extend two small rods which can be adjusted to the back of the rear seat, and can be unfolded by means of a hinge at 30.

*Lateral lockings.*—The lateral and rear locking is effected:

1. For the small roof with frames similar to those described for the previous models and they are placed upon the doors at 31 and 31ª, Figure 20, which hold adhered to them cloth or leather panels for closing the sides and the curve up to the place indicated in the figure. The rear panel is formed with the roof itself which has an extension which drops behind like a tail or a curtain.

2. For the long roof the same elements are used, but other frames at 31ᵇ and 31ᶜ with their respective adhered panels, which at their end are hooked to the movable back of the rear seats.

The frames have in one of the interior angles a small fixed glass, in the form of a sector, (Figure 17, right side frame), to complete the square of the glasses which mount from the rear doors.

The long roof has the same as the short one, a small tail for hooking it to the back of the rear seat.

To finish, and for the greater compacity of the interior, the vizor 32, Figures 19 and 20, which completes the closing of the tail of the "voiturette," when the rear seats are not in position of use, must when the doors are opened, drop into the inner part, turning thereby upon their hinges which are fixed to the back of the front seat.

The advantages of the system in its special application to this model are independent from those which give the invention its character; 1—to allow the practical use of the rear doors, be it that the coach is unroofed, or be it that it has any one of the roofs provided for it, whereas this does not occur with the current models when the cover is lowered; 2—to convert a "voiturette" into a "double phaeton" or into a "drawing room coach" of four seats with all the comfort and appearance of a closed rigid type coach.

*"Double phaeton sedan" type. (Short economical chassis)*

The short chassis does not permit that the two rear doors have a square shape, as they generally reach over the curve of the mudguard and assume its conformation. This also prevents the swing from covering the two doors.

To eliminate this obstacle, the swing can be constructed exclusively upon the counterframe of the front doors, as in the coach type, but to create a really economical type which through its very reduced cost, facilitates economical competition in the sale of cars, we alter the system, suppressing for this type numerous details, so that it remains reduced to the following: 1—The longitudinal beam 33, Figure 21, forms a single piece with the vertical rod 34, which is attached to it in a rigid unmovable shape by its angle 35, being solidly screwed on.

The beam is attached to the windshield through a nipple on the latter and a nipple-shield screw on the former and to the body at point 36.

2—A second beam of same shape at the opposite side with its corresponding vertical rod, which differs from the previous one inasmuch as it can be folded over the beam by means of a hinge at 37.

Once this rod is folded over the beam, this latter one can be rolled up over the leather or cloth of the roof in the same way as the already described models, until reaching the beam 33, which is removed by an upward movement as soon as the nipple shield screw which fastens it to the windshield is unscrewed.

To keep the whole system in the box 6, care must be taken to get at first the rod 34 into the opening 38 in the bottom of the box. This opening is the mouth of a tube placed transversally to the chassis and wherein said rod will remain protected against oxidation and dirt.

The other elements of the body are the usual ones for the previously described models, principally the very economical one which is shown in Figure 14.

*"Coupe cabriolet" type*

One of the vertical rods of the swing is hidden in the channel of the counterframe of the rear door, and the other one in the counterframe at the front part which corresponds to the door of the driver, Figure 22.

To raise it, it is necessary to move it at first along the side by means of the horizontal rod 39 which is at the same time its axle and which projects into the thickness of the panel; and of another rod 40 fixed to the body over which the other end of the swing runs and turns.

Once raised, the swing is moved back to reach again the channels, so as to remain in the position 41.

The longitudinal beams are cut short, thereby leaving the angle of the swing free, see 42, Figures 22 and 23, so as to leave a passage for a similar frame to the one described for the doors 44, Figure 23, which, when it drops upon the back of the driver's seat, will grasp the two swings and follow the rails 43.

This frame forms the front of the "cabriolet" and has a frontispiece upon which the leather of the roof will be put and attached; it completes the form of the longitudinal beams which, due to it, will not reach to the front, and it also has the necessary channels for the shutting of the door and a groove along which will raise the window which proceeds from the back of the driver's seat.

The frame is kept in the box 6ᵃ, Figure 24. Should the interior mechanism of the chassis impede or give the box its necessary dimension, then the frame might be constructed without its interior wood, 44, Figure 23, so that its supports pass through the bottom piece of the box in a similar way to the one described for the fixed rod of the economical double phaeton model.

The other closing elements are the same as for the previous models.

In the appended claims, the term "a convertible automobile" is intended to designate an automobile of any ordinary design that is capable of being converted into an automobile having the same outward appearance and characteristics of another ordinary design.

I claim:

1. A convertible automobile comprising in combination, an open car, the elements of a back and sides of a closed top slidably mounted in the body of said car, means to retain said elements in elevated position, a bail shaped member swingably mounted on each side of said car, a longitudinally movable bar mounted on the cross bar of each bail shaped member, the elements of a roof mounted on one of said bars, and means on each of said bars to embrace and hold said side elements in elevated position when it is moved longitudinally.

2. A convertible automobile comprising in combination, an open car, the elements of a back and sides of a closed top slidably mounted in the body of said car, means to retain said elements in elevated position, a bail shaped member swingably mounted on each side of said car, a longitudinally movable bar mounted on the cross bar of each bail shaped member, the elements of a roof mounted on one of said bars, means on each of said bars to embrace and hold said side elements in elevated position when it is moved longitudinally, and compartments in said car to conceal all the aforesaid elements when not in use.

FÉLIX LÓPEZ-OSORIO.